Sept. 22, 1925.  
N. M. BAKER ET AL  
1,554,901
TEMPLE
Filed Jan. 11, 1924
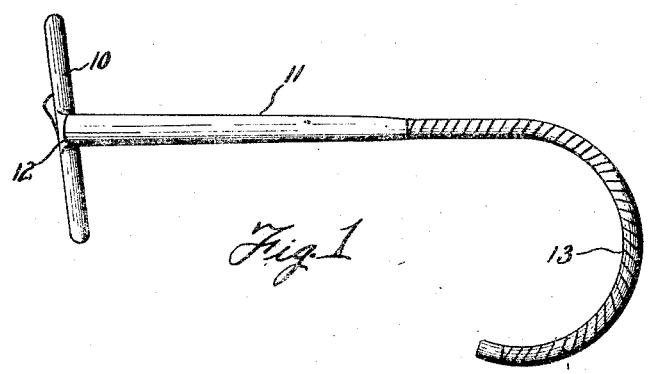
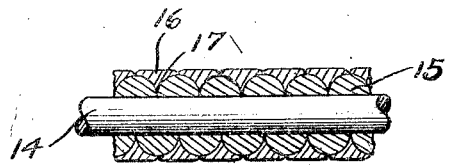
INVENTOR
N. M. BAKER
FRANK FRASER.
BY
Harry H. Styll
ATTORNEY Patented Sept. 22, 1925.

1,554,901

UNITED STATES PATENT OFFICE.

NELSON M. BAKER AND FRANK FRASER, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

TEMPLE.

Application filed January 11, 1924. Serial No. 685,536.

*To all whom it may concern:*

Be it known that we, NELSON M. BAKER and FRANK FRASER, citizens of the United States, residing at Southbridge, in the county of Worcester, and State of Massachusetts, have invented certain new and useful Improvements in Temples, of which the following is a specification.

The present invention relates to an improved form of ophthalmic temple and has particular reference to a temple for use in connection with the so-called all zyl mountings, and particularly to a flexible cable.

A very important object of the invention is to provide a temple of this nature that will be very strong and durable, but which will be simpler and less expensive to manufacture than the temples heretofore constructed.

Another very important object of this invention is to provide a temple that will be flexible, so as to be adaptable to form an earloop, the said temple being so constructed that a smooth even outer surface will be had which will not pinch the skin of the user or catch loose hair.

Other objects and advantages of the invention will become apparent during the course of the following description.

In the drawings wherein like numerals are employed to designate like parts throughout the same, Figure 1 is a side elevation of an ophthalmic mounting showing our improved temple in connection therewith.

Figure 2 is a longitudinal section through one form of temple.

In the drawings, wherein for the purposes of illustration is shown the preferred embodiment of our invention, the numeral 10 designates an ophthalmic mounting with which is associated a temple 11. The temple 11 has at one end the hinge connection 12 and at the opposite end the flexible earloop 13.

In accordance with our invention the earloop is provided with a preferably metallic core 14 around which, as is shown in Figure 2, is wound a semi-cylindrical strip 15. The semi-cylindrical strip 15 may be made from a cellulose composition material which is wound with the adjacent wrappings contacting, as is clearly shown. After the strip 15 has been wrapped as described, a second strip 16, which is preferably of a cellulose composition material, is so formed that a depending pointed portion 17 is adapted to fit between adjacent coils of the strip 15. The width of the strip 16 is of such a measurement that the edges of the adjacent coils will contact so as to present a flat smooth surface, but which will be capable of flexibility. It is to be particularly noted that the strip 16, having the depending pointed portion 17, is adapted to interlock between the adjacent coils of the strip 15 and to form a more snug fit, the faces of the strip 16 are slightly arcuated so as to rest upon the semi-cylindrical strip 15 and to form a good bearing surface during flexure of the entire construction. In other words, the strip 16 will be substantially triangular in cross section except for the fact that two of the faces will be arcuated for the purposes set forth above.

It will thus be seen that we have devised a new form of temple that will be flexible, yet at the same time will be rigid enough to hold the desired shape, while the construction is such that it may be flexed without creating any annoyance to the user.

It is to be understood that the form of our invention herewith shown and described is to be taken as the preferred embodiment of the same, and that various changes in the shape, size and arrangement of parts may be resorted to without departing from the spirit of the invention or the scope of the sub-joined claims.

Having thus described our invention, we claim:

1. A temple of the character described, comprising a core, a coil semi-circular in cross section arranged thereon with the curved portion of the coil on the side opposite from the core, and a substantially triangular covering arranged around said coil and fitting into the interstices between the curved portions thereof.

2. A temple of the character described, comprising a core, a coil having a cross section whose outer portion is curved, arranged around the core, and a strip of cellulose composition material arranged around the coil and fitting into the interstices between the curved portions thereof and having a straight outer surface.

3. A temple of the character described, comprising a core, a coil semi-circular in cross section arranged thereon with the curved portion of the coil on the side opposite from the core, and a strip of cellulose composition material substantially triangular in cross section wrapped around said coil and fitting into the interstices between the curved portions thereof.

4. A temple of the character described, comprising a metallic core, a coil of cellulose composition semi-circular in cross section arranged thereon with the curved portion of the coil on the side opposite from the core, and a substantially triangular cellulose composition strip wrapped around said coil and fitting into the interstices between the curved portions thereof, the outer faces of the adjacent coils of the strip forming a smooth surface.

NELSON M. BAKER.
FRANK FRASER.